US008707538B2

(12) United States Patent
Bobenhausen

(10) Patent No.: US 8,707,538 B2
(45) **Date of Patent: *Apr. 29, 2014**

(54) METHOD AND APPARATUS FOR CONNECTING A HOSE TO A FITTING

(71) Applicant: Larry F. Bobenhausen, St. Petersburg, FL (US)

(72) Inventor: Larry F. Bobenhausen, St. Petersburg, FL (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/644,088

(22) Filed: Oct. 3, 2012

(65) Prior Publication Data

US 2013/0042463 A1 Feb. 21, 2013

Related U.S. Application Data

(63) Continuation of application No. 12/634,882, filed on Dec. 10, 2009, now Pat. No. 8,302,283.

(51) Int. Cl.
*B23P 11/00* (2006.01)
*B23P 19/04* (2006.01)

(52) U.S. Cl.
USPC .......................................... 29/525.01; 29/268

(58) Field of Classification Search
USPC .............. 29/525.01, 237, 278, 267, 282, 428, 29/464, 468, 469.5, 505, 508, 268
See application file for complete search history.

(56) References Cited

U.S. PATENT DOCUMENTS 6,206,048 B1 3/2001 Bobenhausen
7,114,229 B1 10/2006 Nago
8,302,283 B2 * 11/2012 Bobenhausen ................. 29/464

* cited by examiner

*Primary Examiner* — John C Hong
(74) *Attorney, Agent, or Firm* — Larson & Larson, P.A.; Frank Liebenow; Justin P. Miller

(57) ABSTRACT

A clamp tool that has stop edges and ear edges is disclosed. In one embodiment, stop edges close against each other while the ear edges, being cut deeper than the stop edges, do not touch each other and provide a space between which an ear of a clamp is position and closed by the clamp tool without cutting or nicking unnecessarily into the ear of the clamp. The width of the stop edges is predetermined to provide an alignment for proper alignment of the clamp on a hose that obscures features of a fitting that is positioned beneath the hose.

20 Claims, 8 Drawing Sheets

METHOD AND APPARATUS FOR CONNECTING A HOSE TO A FITTING

CROSS-REFERENCE TO RELATED APPLICATION

This application is a continuation of U.S. patent application Ser. No 12/634,882, filed Dec. 1, 2009, the disclosure of which is hereby incorporated by reference.

FIELD

This invention relates to a method for connecting a hose to a fitting. More particularly, it refers to a method of connecting a hose to a fitting using one or more clamps.

BACKGROUND

Air conditioning hose assembly connection systems are known. The simplest is to fit an end of a flexible, compressible hose over a metal fitting or stem and attaching clamps on the hose over the fitting to hold the hose to the fitting and to prevent leaks in various applications such as with high pressure refrigerants. Often, this is not sufficient for such high pressure connections because the hose tends to slip off the fitting. To improve this type of connection, the fitting is made with one or more ridges or beads that help hold the hose to the fitting. Still, in high-pressure applications, it is still possible for the hose to come free from the fitting.

To further improve the connection, guides have been deployed to guide the installation of the clamps such that the clamps situate themselves between the ridges/beads, making it even more difficult for the hose to slip off of the fitting.

What is needed is a tool that aligns the clamps between the ridges/beads without the need for guides and the tool needs to provide force to tighten the clamp.

SUMMARY

A clamp tool has stop edges and ear edges. The stop edges close against each other while the ear edges, being cut deeper than the stop edges, do not touch each other and provide a space between which an ear of a clamp is position and later closed by the clamp tool without cutting or nicking unnecessarily into the ear of the clamp. In some embodiments, the width of the stop edges is made to provide an alignment tool for proper alignment of the clamp on a hose over features of a fitting.

The invention includes a clamp tool that has a first head member and a second head member. The first head member movably coupled to the second head member (e.g., by a lever, a ratchet, threads, hydraulics, motors, solenoids, etc.). The first head member has two stop edges and an ear edge positioned between the stop edges. The second head has an edge such that, as the first head member and the second head member move from an open position in which the stop edges of the first head member are distal from the edge of the second head member to a closed position in which the stop edges of the first head member abuts the edge of the second head member, there is a gap between the ear edge of the first member and the edge of the second head member. A width of at least one of the two stop edges provides an index for placement of a clamp.

In another embodiment, a method of joining a flexible hose to a rigid, hollow shaft is disclosed. The rigid, hollow shaft has at least one bead and a stop whereby clamp placement needs to not overlap any of the at least one bead. The method steps include (a) providing the clamp tool as previously described and (b) providing an end of the hose cut at 90 degrees. The method continues with (c) placing at least one hose clamp loosely over the hose and (d) pushing the end of the hose over the rigid, hollow shaft, the end of the hose abutting the stop then (e) opening the clamp tool (if not already open) and (f) positioning an ear of a first hose clamp of the at least one hose clamp between the ear edge and the stop edge of the second head member. Next, an edge of the first head member is aligned with a reference point, thereby positioning the first hose clamp properly between the reference point and a first bead of the at least one bead at which time (h) the first head member is closed towards the second head member, thereby compressing the ear of the first hose clamp between the ear edge and the stop edge of the second head member and thereby compressing the hose over the first bead.

In another embodiment, a clamp tool is disclosed having a mechanism for opening and for closing between an edge of a first head member and an edge of a second head member (for example lever, wedge, screw, hydraulic, electrical, magnetic, etc.), at least one of the edge of the first head member and the edge of the second head member has an ear edge. At least one of the first head member and the second head member has a way to index the ear edge at a predetermined distance from a reference, thereby allowing placement of a clamp over a fitting, such that, when aligned with the reference, the clamp is correctly placed with respect to the fitting. Once the tool is aligned with the reference point and an ear of the clamp is engaged with the at least one ear edge, the clamp is situated correctly on the hose with respect to features of the fitting, thereby, upon closing the means for opening and closing, the clamp is compressed at a desired location over the fitting.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
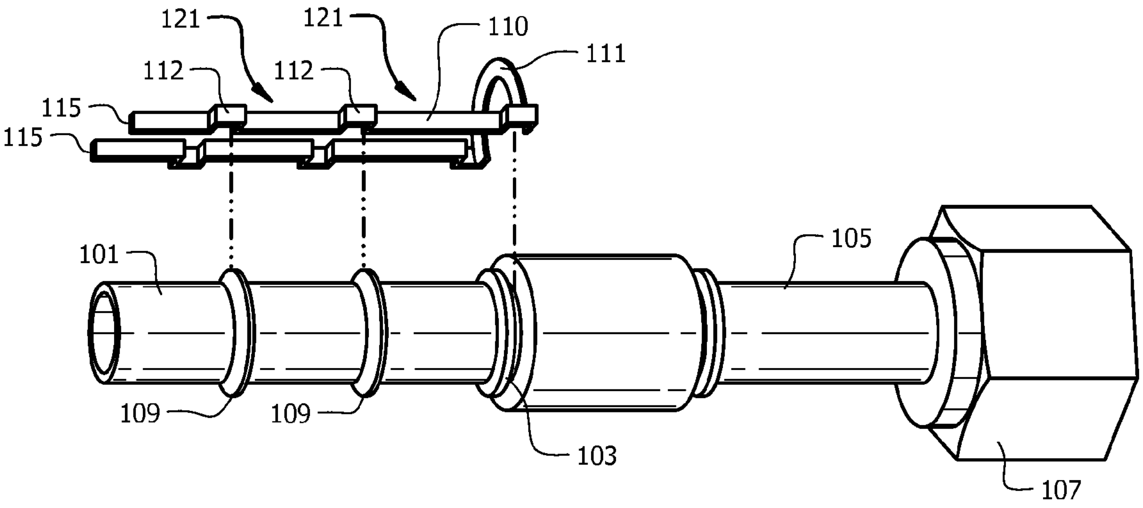
FIG. 1 (Prior Art)
FIG. 1 illustrates a clamp guide of the prior art.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a perspective view of a clamp guide 110 of the prior art is shown. The prior art for connecting a flexible hose to a rigid, hollow shaft 101/105 includes a clamp guide 110 as shown in FIG. 1. The clamp guide 110 has registration areas 121 between ridges 112 that align with beads 109 on a typical hose-connection end 101 of the rigid, hollow shaft 101/105. In this example, the clamp guide 110 has a semi-circular portion 111 that fits inside a groove 103 in the rigid hollow shaft 101/105 so that the clamp guide arms 115 are on opposite sides of the flexible hose (not shown) when the flexible hose is positioned over the receiving end 101 of the rigid, hollow shaft 101/105. The rigid, hollow shaft 101/105 is anticipated to be a component of a variety of connectors and fittings, one example is shown having a threaded fitting 107 at an end 105 distal from where a flexible hose is attached using the clamp guide 110 and clamps (not shown).

When installing the clamps (not shown) on the hose (also not shown), it is important that the clamps align with the gaps between the beads 109 to provide maximum burst force. Otherwise, the clamp will be aligned over one of the beads 109 and will not hold the hose correctly to the hollow shaft 101 and, under pressure, the hose will pull away from the hollow shaft 101. The guides 110 help align the clamps for maximum operating pressure. In this method, the installer is required to maintain an inventory of different guides, for different fittings making it is possible for an installer to use the wrong guide, creating a weak joint between the hose and the fitting.

Figure 2:
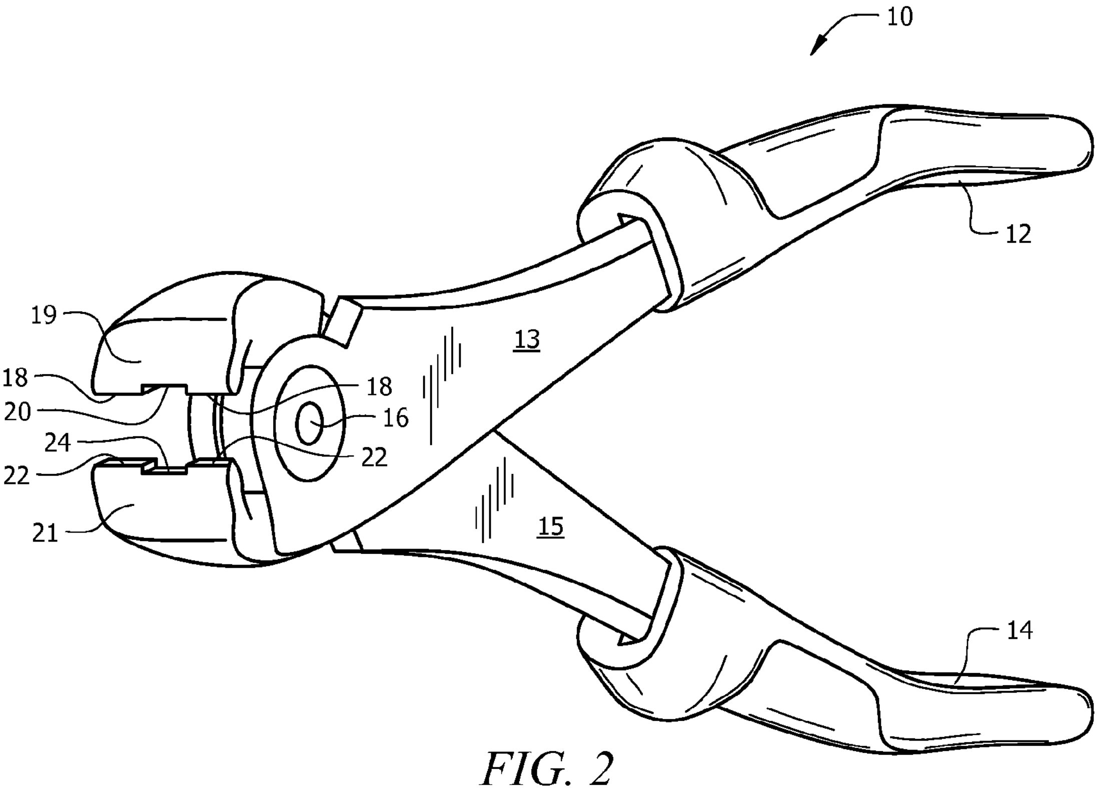
FIG. 2 illustrates a perspective view of an embodiment of a clamp tool.
Figure 3A:
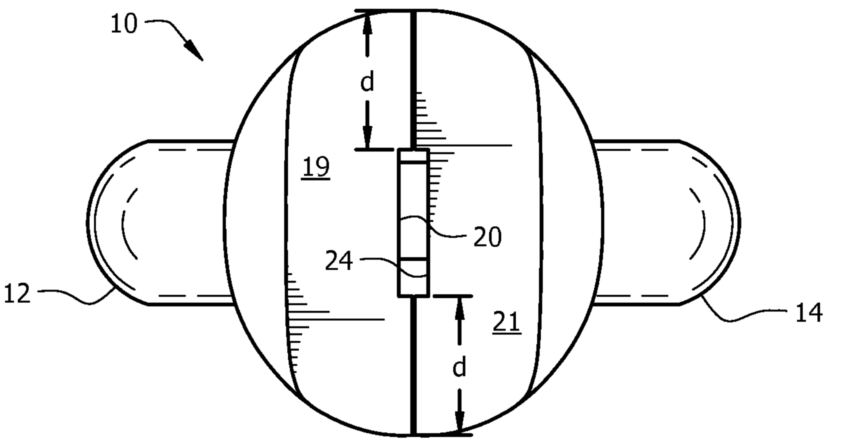
FIG. 3A illustrates a top plan view of an embodiment of the clamp tool in a closed position.
Figure 3B:
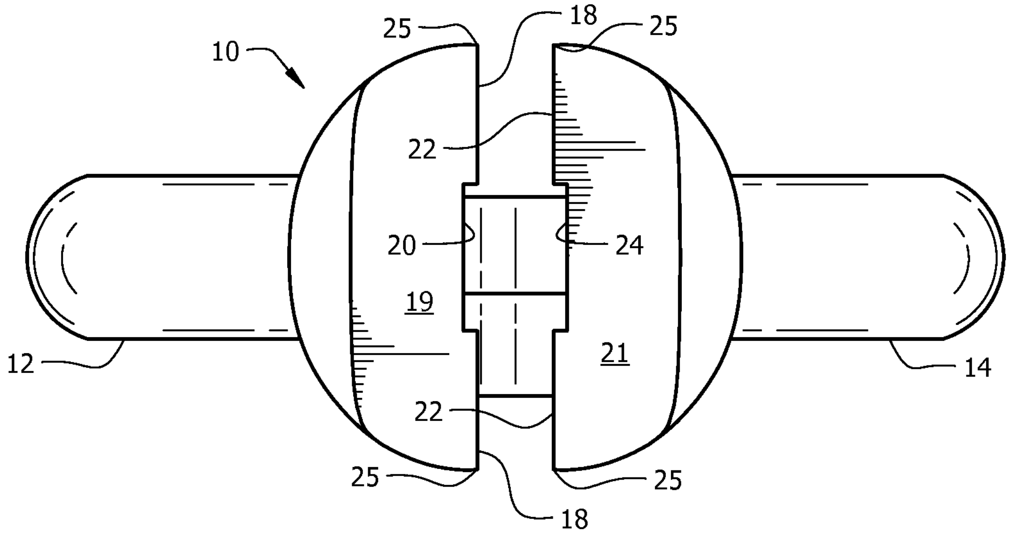
FIG. 3B illustrates a top plan view of an embodiment of the clamp tool in an open position.

Referring to FIGS. 2, 3A and 3B, perspective views of an embodiment of a clamp tool 10 are shown. The clamp tool 10 has two members 13/15 with handles 12/14 at one end for holding and for exerting pressure by a user. The members/15 provide force to opposing head members 19/21 at the other end of the members 13/15, being fulcrums coupled by a pivot 16 such as a typical wire cutter or other pliers. Although the mechanism for moving the head members 19/21 to/from a closed position is a lever (including handles 12/14, member 13/15, and pivot 16), any mechanism that moves two objects to/from a closed (e.g. touching) position is anticipated, including, but not limited to, levers, ratchets, worm gears, gearing systems, solenoids, hydraulic systems, motor systems, etc.

Figure 5A:
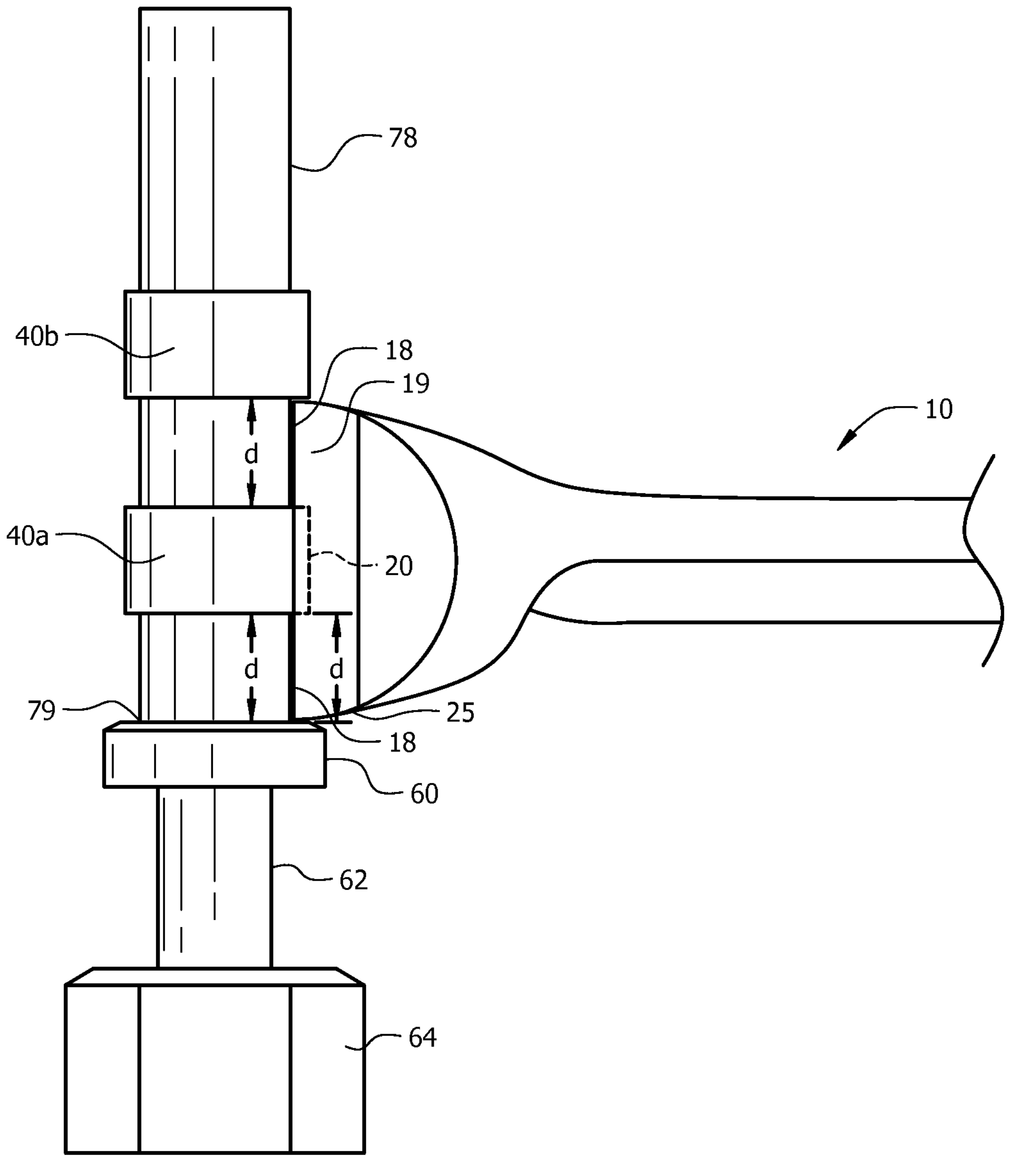
FIG. 5A illustrates a front plan view of an embodiment in use, tightening a first clamp on a hose.
Figure 5B:
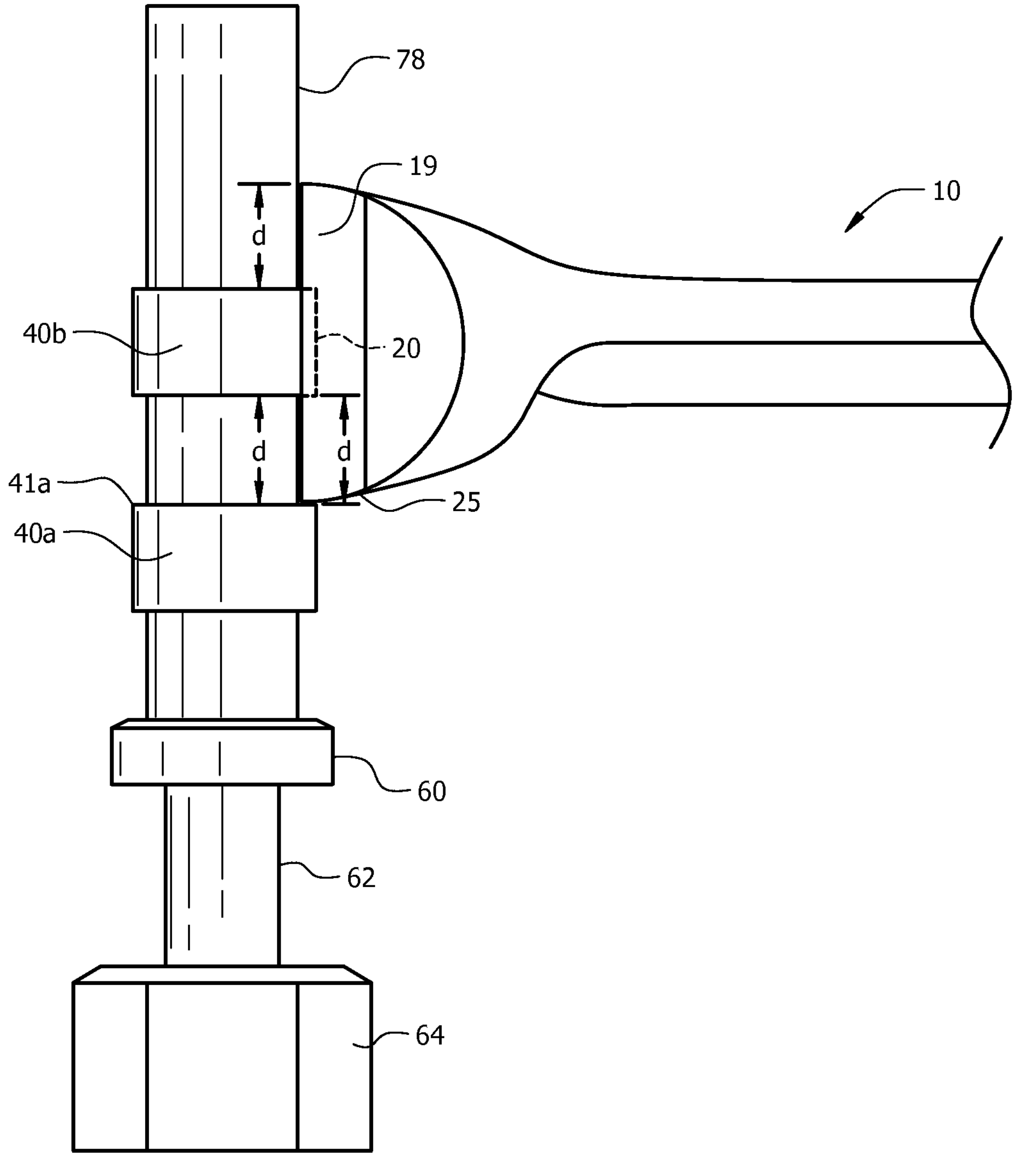
FIG. 5B illustrates a front plan view of an embodiment in use, tightening a second clamp on a hose.
Figure 6:
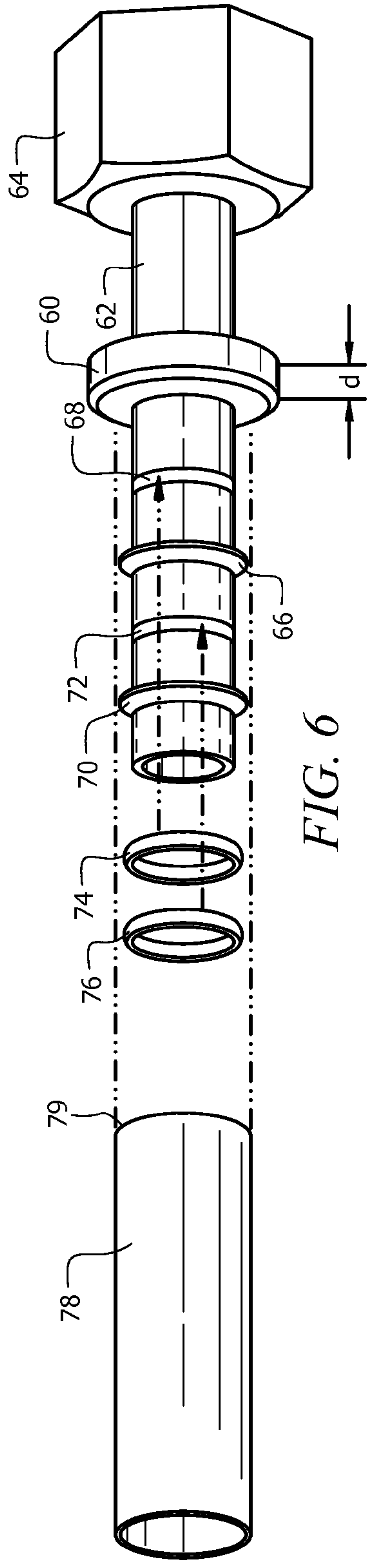
FIG. 6 illustrates a perspective view of one typical fitting.

The mating edges 18/20/22/24 of the opposing heads 19/21 are formed for a given hose clamp 40/42 (see FIGS. 4A/4B also referred to as Pinch-clamps, Click-clamps, O-Clips, O-Clamps, Ear-Clamps or Ear-Clips, etc) and fitting (see FIGS. 6/7). In that, the ear interface edges 20/24 that mate with the hose clamp ear 42 are recessed. Since the ear interface edges 20/24 are recessed inward of the stop edges 18/22, the ear interface edges 20/24 don't cut into the hose clamp ear 42 when the clamp tool 10 is closed. This is shown in FIG. 3A, in which the opposing head members 19/21 of the clamp tool 10 are in a closed position having a gap between the ear interface surfaces 20/24. FIG. 3B shows the clamp tool 10 in an open position ready to accept the ears 42 of a hose clamp 40/42. As will be shown in FIGS. 5A and 5B, the width, d, of the stop edges 18/22 provide a reference or fixed/predetermined distance between the sides 25 of the clamp tool 10 and the ear interface surfaces 20/24. This width, d, corresponds to the correct placement of the clamp 40/42 with respect to an edge 79 of the hose 78, an index/reference line (not shown) or bead 60 of the fitting 62. This enables correct alignment of the hose clamp 40/42 with, for example, the fitting 62 elements. Many clamp tool 10 sizes are anticipated for different fitting 62 sizes and different clamp 40/42 sizes. Such alignment is desired because the various elements of the fitting 62 are not visible once the hose 78 is positioned over the fitting 62.

In some embodiments, the ear interface surfaces 20/24 are held apart by a mechanism associated with the members 13/15, handles 12/14 and the pivot 16, not requiring the stop edges 18/22 to touch. Such mechanisms are known in the industry, for example, a pin in one member 13 and a slot in the second member 15 such that the pin reaches the end of the slot before the stop edges 18/22 meet. In some versions of this embodiment, the stop edges 18/22 are not included and in alternate embodiments of this, marks are made to indicate a location or center for locating the ear 42 of the clamp 40 during compression.

In some embodiments, only one stop edge 18 is present and the edge 18/22 of the opposing head member 19/21 is substantially flat.

Figure 4A:
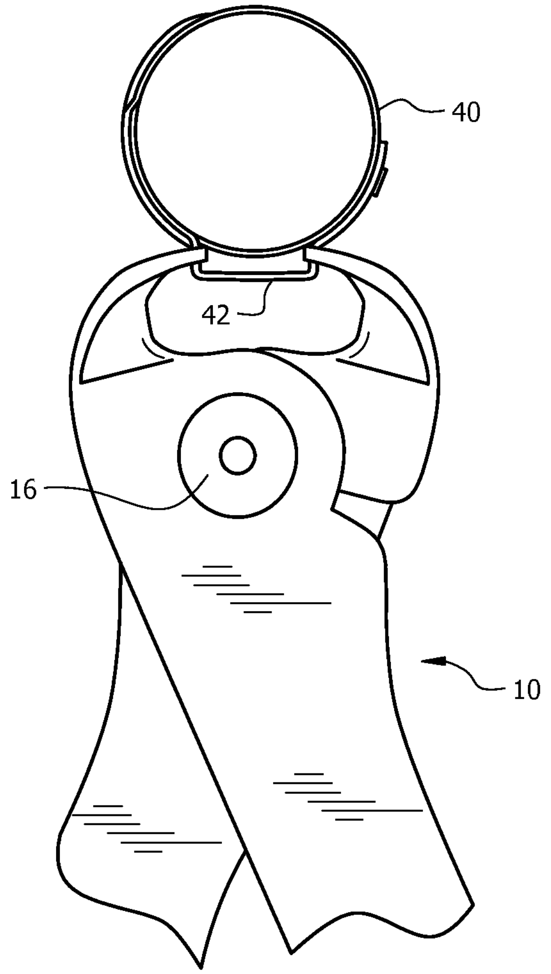
FIG. 4A illustrates a side plan view of an embodiment of the clamp tool ready to tighten a clamp in the open position.
Figure 4B:
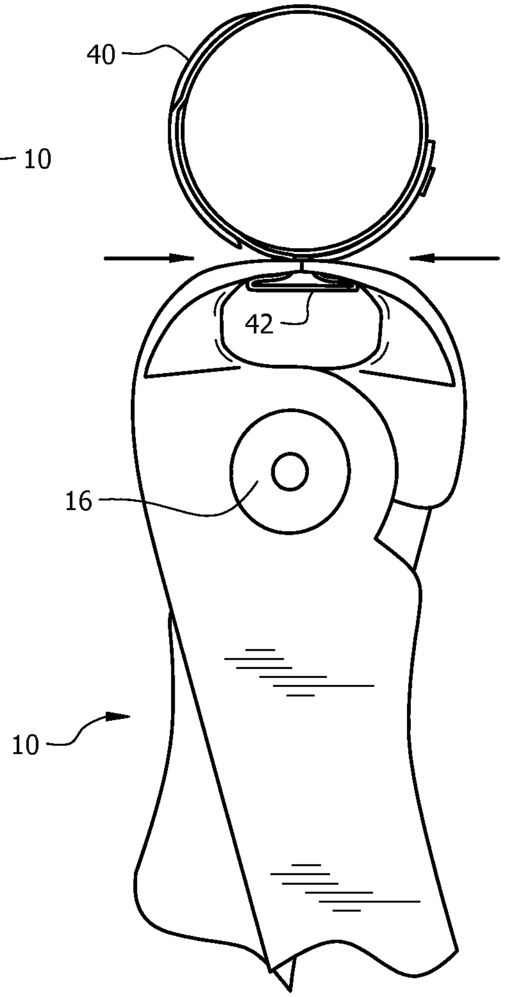
FIG. 4B illustrates a side plan view of an embodiment of the clamp tool after compression of the clamp, in the closed position.

Referring to FIGS. 4A and 4B, side plan views of an embodiment of the clamp tool 10 are shown. In FIG. 4*a*, the clamp tool 10 is ready to tighten a clamp ear 42 of a clamp 40. The ear 42 is positioned between the ear interface edges 20/24. In FIG. 4B, the clamp tool 10 has compressed the clamp ear 42 under force provided by a user pushing together the handles 12/14.

Referring to FIGS. 5A and 5B, front plan views of the clamp tool 10 in use, tightening a first clamp 40*a* on a hose 78 are shown. The width of the stop edges 18/22 (only stop edge 18 is visible) are such that, aligning the side 25 of the clamp tool 10 with the end 79 of the hose 78 or with the stop wall 60 of the fitting 62 as shown in FIG. 5A correctly positions the first clamp 40*a* over the fitting 62. The width, d of the stop edges 18/22, is related to the correct location of the clamp 40*a* on the fitting 62. Likewise, as shown in FIG. 5B, aligning the side 25 of the clamp tool 10 with the right edge 41*a* of the first clamp 40*a* correctly positions the second clamp 40*b* on the fitting 62. The width, d of the stop edges 18/22, is related to the correct location of the clamp 40*b* on the fitting 62 with respect to the clamp 40*a*. In such, the clamp tool 10 provides correct location for one, two, three or any number of clamps 40/40*a*/40*b* on fittings made for such clamps 40/40*a*/40*b*.

It is anticipated that some embodiments have two different widths on each side of the clamp tool 10 heads 19/21 for locating clamps 40 onto different fittings 62. For example, one mating side of each head 19/21 has a first width, d, and the other mating side of each head 19/21 has a second width, d'. The first side is used to align clamps 40 on a first fitting 62 while the second side is used to align clamps 40 on a second fitting 62. It is also anticipated that multiple clamp tools 10 have different head widths, d, and each tool for a different fitting 62.

Figure 7:
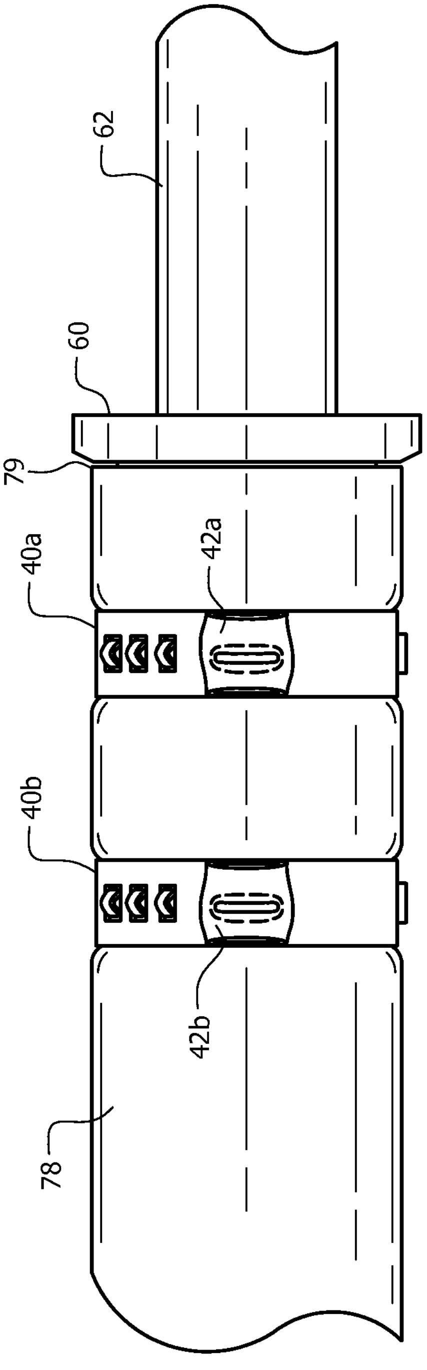
FIG. 7 illustrates a perspective view of a hose held on a typical fitting using two clamps.

Referring to FIGS. 6 and 7, a perspective view of one typical fitting is shown before assembly (FIG. 6) and after assembly (FIG. 7). The fitting 62 is an exemplary fitting and many other configurations and styles of fittings are known, all of which are anticipated by the present invention and all of which benefit from the correct alignment of the hose clamps 40/40*a*/40*b*. The fitting 62 of this example has a connector end 64 and a stop 60, to which the end of the hose 78 abuts. This fitting 62 has beads 66/70 and optional grooves 68/72 for accepting optional o-rings 74/76. During installation of the hose 78, the hose clamps 40*a*/40*b* are loosely placed over the hose 78 and then the edge 79 of the hose 78 is pushed over the fitting 62 until the edge 79 of the hose 78 abuts against the stop 60. Note, for fittings without a stop 60, a reference mark (not shown) indicates how far to push the hose 78 onto the fitting 62, thereby aligning the edge 79 of the hose 78 to the reference mark. The clamps 40*a*/40*b* are then positioned correctly and the ears 42*a*/42*b* of the clamps 40*a*/40*b* are compressed with the clamp tool 10. For maximum burst protection and minimum leakage, it is important to align the clamps 40*a*/40*b* between the beads 66/70 and between the inner-most bead 66 and the stop 60. In this way, the clamps 40*a*/40*b* compress the hose 78 between the beads 66/72 and stops 60, making it harder for the hose 78 to pull off the fitting 62. If the clamps 40*a*/40*b* are mis-aligned over, say, one of the beads 66/72, then the clamp 40*a*/40*b* cannot be tightened enough to flatten the hose 78 against the flat surface of the fitting 62 and, if provided, against the o-ring 74/76. To this means, the width of the stop edges 18/22 are made such that the widths match the distance between the stop 60 and the first clamp 40*a* when the first clamp ear 42*a* is between the ear interface edges 20/24 and/or the width matches the distance between the opposite edge of the first clamp 40*a* and the second clamp 40*b* when the second clamp ear 42*b* is between the ear interface edges 20/24.

FIG. 7 shows the final connection of the hose 78 to the fitting 62 with the first clamp 40*a*/42*a* in the proper position with respect to the end 79 of the hose 78 or the stop 60 and the second clamp 40*b*/42*b* in the proper position with respect to the first clamp 40*a*/40*b*. The position of the clamps 40*a*/40*b* having been correctly set over the proper features of the fitting 62 using the width, d, of the stop edges 18/22. For example, when O-rings 74/76 are provided, it is important to align the clamp 40*a*/40*b* approximately centered over the O-rings 74/76. Conversely, it detracts from the strength of the hose 78 and fitting 62 connection if one or more of the clamps 40*a*/40*b* are positioned over the bumps 66/70 (e.g., the clamps 40*a*/40*b* must be positioned between the bumps 66/70 for optimal strength of the hose 78 and fitting 62 connection.

It is anticipated that the stop edges 18/22 of the clamp tool 10 have, in some embodiments, flat edges 18/22 while in other embodiments, the stop edges 18/22 have pointed edges 18/22 for cutting such as for cutting wires, clamps (e.g. cutting off old clamps), etc.

Figure 8:
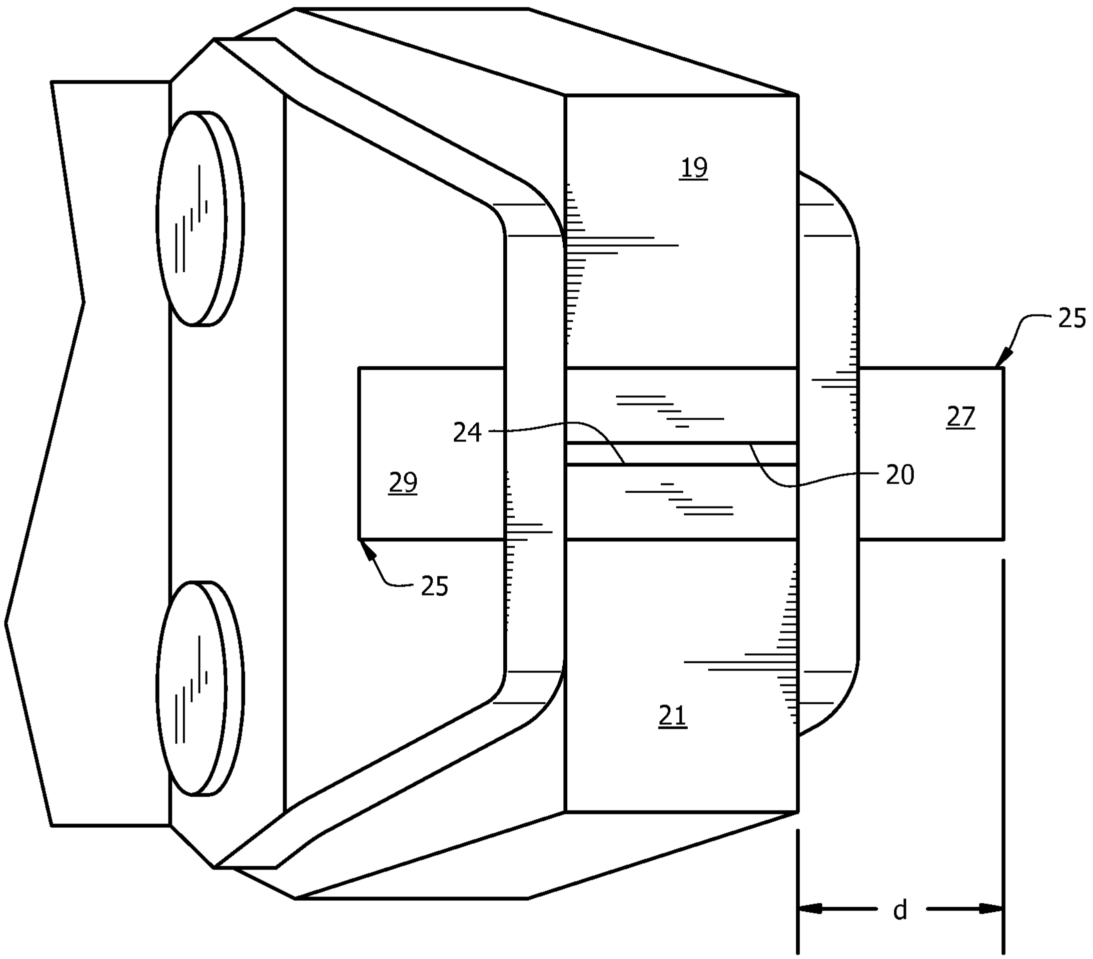
FIG. 8 illustrates a perspective view of another embodiment of a clamp tool.

Referring to FIG. 8, a perspective view of another embodiment of a clamp tool 10*a* is shown. In this embodiment, the first head 19 and the second head 21 are opened/closed by handles and/or other ratcheting devices (not shown). Although not required, it is preferred that the ear edges 20/24 are separated by a gap (as shown) when the heads 19/21 of the clamp tool 10*a* are closed, thereby reducing stress/cutting into the ear 42 of the clamp 40. In this clamp tool 10*a*, indexing extensions 27/29 extend outwardly, providing reference ends 25 which are the proper distance, d, from a reference point 60/79/41*a* (stop 60, hose end 79, previous clamp edge 41*a*, etc) in a fitting installation. In this way, when one of the indexing extensions is aligned with the reference point 60/79/41*a* and the clamp 40 is between the ear edges 20/24 and the clamp tool 10*a* is closed, the clamp 40 is tightened over the correct location/features of the underlying fitting 62, thereby providing an optimal strength connection between the fitting 62 and the hose 78.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A clamp tool comprising:

a first head member and a second head member, the first head member movably coupled to the second head member;

the first head member having two stop edges and an ear edge, the ear edge positioned between the stop edges; and the second head having an edge;

whereas, the first head member and the second head member move from an open position in which the stop edges of the first head member are distal from the edge of the second head member to a closed position in which the stop edges of the first head member abuts the edge of the second head member thereby providing a gap between the ear edge of the first member and the edge of the second head member;

whereas a width of at least one of the two stop edges provides an index for placement of a clamp.

2. The clamp tool of claim 1, whereas a width of a first stop edge of the stop edges of the first head member is an index between a reference point of a fitting and a preferred location of a clamp over a bead of the fitting.

3. The clamp tool of claim 2, whereas a width of a second stop edge of the stop edges of the first head member is a second index between the reference point of the fitting and a second preferred location of a second clamp over a second bead of the fitting.

4. The clamp tool of claim 1, wherein the ear edge is substantially flat.

5. The clamp tool of claim 4, wherein the stop edges of the first head member comprises a left stop edge and a right stop edge and a width of the left stop edge is a guide for proper placement of the clamp on a first type of fitting and a width of the right stop edge is a guide for proper placement of the clamp on a second type of fitting; and the width of the left stop edge is not equal to the width of the right stop edge.

6. The method of claim 5, further comprising the steps of:

(i) opening the clamp tool;

(j) positioning an ear of a second hose clamp of the at least one hose clamp between the ear edge and the stop edge of the second head member;

(k) aligning the edge of the first head member with an edge of the first hose clamp, thereby positioning the second hose clamp between a first bead and a second bead of the at least one bead; and (l) closing the first head member towards the second head member, thereby compressing the ear of the second hose clamp and compressing the hose between the first bead and the second bead.

7. The clamp tool of claim 1, wherein the edge of the second head member is substantially flat.

8. The clamp tool of claim 1, wherein the edge of the second head member has two stop edges and an ear edge.

9. The clamp tool of claim 1, wherein the first stop edges and the second stop edge are pointed, thereby forming a cutting edge interface.

10. The clamp tool of claim 1, wherein a width of the ear edge is such that an ear of a clamp fits width-wise between the stop edges of the first head member.

11. A method of joining a hose to a rigid, hollow shaft, the rigid, hollow shaft having at least one bead and a stop, whereby optimal clamp placement is between the stop and the at least one bead or between and the at least one beads, the steps comprising:

(a) providing the clamp tool of claim 1;
(b) providing an end of the hose cut at 90 degrees;
(c) placing at least one hose clamp loosely over the hose;
(d) pushing the end of the hose over the rigid, hollow shaft, the end of the hose abutting the stop;
(e) opening the clamp tool;
(f) positioning an ear of a first hose clamp of the at least one hose clamp between the ear edge and the stop edge of the second head member;
(g) aligning an edge of the first head member with a reference point, thereby positioning the first hose clamp properly between the reference point and a first bead of the at least one bead; and
(h) closing the first head member towards the second head member, thereby compressing the ear of the first hose clamp between the ear edge and the stop edge of the second head member and thereby compressing the hose over the first bead.

12. The method of claim 11, wherein the reference point is the stop.

13. The method of claim 11, wherein the reference point is the end of the hose.

14. The method of claim 11, wherein the hollow shaft further includes at least one o-ring groove between the stop and the first bead, the at least one o-ring grooves is fitted with an o-ring and the step of positioning properly positions the first clamp over the o-ring.

15. A clamp tool comprising:

a means for opening and for closing between an edge of a first head member and an edge of a second head member, at least one of the edge of the first head member and the edge of the second head member having an ear edge; and at least one of the first head member and the second head member having a means for indexing, the means for indexing providing a reference for placement of a clamp over a fitting, such that, when the means for indexing is aligned with a reference point, the clamp is correctly placed with respect to the fitting;

whereby, when the means for indexing is aligned with the reference point and an ear of the clamp is engaged with the at least one ear edge, the clamp is situated correctly on the hose with respect to features of the fitting, thereby, upon closing the means for opening and closing, the clamp is compressed at a desired location over the fitting.

16. The clamp tool of claim 15, wherein the reference point is an end of the hose.

17. The clamp tool of claim 15, wherein the reference point is an edge of an adjacent clamp.

18. The clamp tool of claim 15, wherein when the means for opening and closing is in a closed position, a surface of the ear edge of the first head member and either a surface of the edge of the second head member or a surface of the ear edge of the second head member are separated by a gap.

19. The clamp tool of claim 15, wherein a width of the ear edge is substantially the width of the ear of the clamp.

20. The clamp tool of claim 15, wherein the edge of the first head member has an ear edge and the edge of the second head member has an ear edge.

* * * * *